(12) United States Patent
Nishimura

(10) Patent No.: US 8,660,752 B2
(45) Date of Patent: Feb. 25, 2014

(54) ELECTRIC POWER STEERING SYSTEM

(75) Inventor: Hiroshi Nishimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 484 days.

(21) Appl. No.: 13/085,935

(22) Filed: Apr. 13, 2011

(65) Prior Publication Data

US 2012/0101683 A1   Apr. 26, 2012

(30) Foreign Application Priority Data

Oct. 26, 2010   (JP) .................................. 2010-239748

(51) Int. Cl.
*A01B 69/00*   (2006.01)

(52) U.S. Cl.
USPC ................ 701/41; 180/446; 180/443; 701/43

(58) Field of Classification Search
USPC .............. 701/41, 43; 318/473, 432, 430, 434, 318/400.22; 180/446, 404, 407, 422; 361/24
See application file for complete search history.

(56) References Cited

U.S. PATENT DOCUMENTS

| 4,878,004 | A | 10/1989 | Shimizu | |
| 7,203,583 | B2 * | 4/2007 | Fujimoto et al. | 701/41 |
| 2005/0269150 | A1 * | 12/2005 | Fujimoto et al. | 180/446 |

FOREIGN PATENT DOCUMENTS

| DE | 19908572 A1 | 8/2000 |
| EP | 0903279 A2 | 3/1999 |
| EP | 1306287 A2 | 5/2003 |
| EP | 1477386 A2 | 11/2004 |
| EP | 2168842 A1 | 3/2010 |
| JP | 7-077102 A | 3/1995 |
| JP | 9-051605 A | 2/1997 |
| JP | 2892899 B2 | 5/1999 |
| JP | 2000-089805 A | 3/2000 |
| JP | 3405292 B2 | 5/2003 |
| JP | 2006-044437 A | 2/2006 |
| JP | 2006-224690 A | 8/2006 |
| WO | 2008/153162 A1 | 12/2008 |

OTHER PUBLICATIONS

Japanese Office Action, dated Sep. 4, 2012, issued in corresponding Japanese Application No. 2010-239748.

* cited by examiner

*Primary Examiner* — Behrang Badii
(74) *Attorney, Agent, or Firm* — Sughrue Mion, PLLC

(57) ABSTRACT

An electric power steering system includes an overheat protection current value arithmetic unit that computes an overheat protection current value to which a current flowing into a motor is limited, and an overheat protection control unit that limits the current, which flows into the motor, on the basis of the computed overheat protection current value, suppresses heat dissipation caused by the current flowing into the motor, and thus protects onboard equipment. Information relevant to the computed overheat protection current value is stored. Whether a newly computed overheat protection current value is abnormal is decided based on comparison of the newly computed overheat protection current value with the stored information relevant to the overheat protection current value.

6 Claims, 11 Drawing Sheets

ELECTRIC POWER STEERING SYSTEM

BACKGROUND OF THE INVENTION

1. Field of the Invention

The present invention relates to an electric power steering system that drives or controls a motor on the basis of a steering wheel torque exerted by a driver of a vehicle, and alleviates the driver's steering wheel torque by utilizing a power generated by the motor.

2. Description of the Related Art

Electric power steering systems exert the capability of an electric power steering system by driving a motor. Along with driving of the motor, an engine control unit (hereinafter called an ECU) that controls the motor or the like, or the motor dissipates heat. In order to prevent the ECU and motor from being broken due to heat dissipation, the electric power steering system generally includes an overheat protection unit that limits a current, which is conducted to the motor, so as to suppress the heat dissipation.

As the overheat protection unit included in the electric power steering system, a unit that estimates a temperature rise, which stems from heat dissipation from the heat dissipating regions of the ECU and motor respectively, on the basis of a cumulative value of the current conducted to the motor, computes a time, which it takes to turn off the power supply of a control unit on the basis of the estimated temperature rise, after discontinuing feed of power to the motor, and turns off the power supply of the control unit after the elapse of the computed time (refer to, for example, Patent Document 1, and a unit that estimates the heat dissipating states of the heat dissipating regions of the ECU and motor respectively using temperature sensors attached to the ECU and motor respectively, and discontinues a power supply relay on the basis of the estimated temperatures (refer to, for example, Patent Document 2 have been proposed in the past.

Patent Document 1: Japanese Patent No. 2892899 (JP-A-6-247324))

Patent Document 2: JP-A-2006-224690)

The foregoing existing overheat protection unit decides the heat dissipating states on the basis of a cumulative value of a current conducted to the motor or the values provided by the temperature sensors, and prevents the ECU and motor from being broken due to heat dissipation. If an error occurs in the computation performed to decide the heat dissipating states, there is a possibility that the overheat protection unit may not function and the ECU or motor may be damaged.

For example, since the existing overheat protection unit described in the Patent Document 1 decides the heat dissipating state on the basis of the cumulative value of the current conducted to the motor, and limits or discontinues the current to be conducted to the motor, if the cumulative value deviates from a true value because of occurrence of an abnormality in computation of an overheat protection limit value or in a RAM in which the cumulative value is stored, the succeeding computation is performed based on the erroneous cumulative value. As a result, limitation of the motor current to be performed by the overheat protection unit may be performed insufficiently or excessively.

As a unit that senses an error in computation to be performed in order to decide the heat dissipating state, a unit that allows a physically independent arithmetic unit or the like to perform the same calculation and monitors the unit or is monitored by the unit through communication is conceivable. However, this poses a problem in that the system becomes expensive.

SUMMARY OF THE INVENTION

An object of the present invention is to solve the foregoing problems with which the existing electric power steering systems are confronted.

An electric power steering system in accordance with the present invention includes a motor that is driven based on a target current value computed in line with a steering wheel torque exerted by a driver, and alleviates a driver's steering effort using an assistant torque generated by the motor. The electric power steering system includes an overheat protection current value arithmetic unit that computes an overheat protection current value to which a current flowing into the motor is limited, and an overheat protection control unit that limits the current, which flows into the motor, on the basis of the computed overheat protection current value, suppresses heat dissipation caused by the current flowing into the motor, and protects onboard equipment. The electric power steering system is characterized in that: the computed overheat protection current value or information relevant to the overheat protection current value is stored; and whether a newly computed overheat protection current is abnormal is decided based on comparison of the newly computed overheat protection current value with the stored information relevant to the overheat protection current value.

According to the electric power steering system in which the present invention is implemented, the overheat protection current value arithmetic unit that computes an overheat protection current value to which a current flowing into the motor is limited, and the overheat protection control unit that limits the current, which flows into the motor, on the basis of the computed overheat protection current value, suppresses heat dissipation caused by the current flowing into the motor, and protects onboard equipment are included. Information relevant to the computed overheat protection current value is stored, and whether a newly computed overheat protection current value is abnormal is decided based on comparison of the newly computed overheat protection current value with the stored information relevant to the overheat protection current value. A characteristic that a change in the temperature of a heat dissipating region of an ECU, a motor or the like is made moderately for an arithmetic cycle of the overheat protection control unit is utilized, and a previously computed overheat protection limit value or information relevant to the overheat protection current value is stored. If a difference between a result of new computation for overheat protection and a result of previous computation for overheat protection exceeds a predetermined value, an abnormality in computation for overheat protection is recognized. Thus, a highly reliable electric power steering system can be provided.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

Embodiment 1

Figure 1:
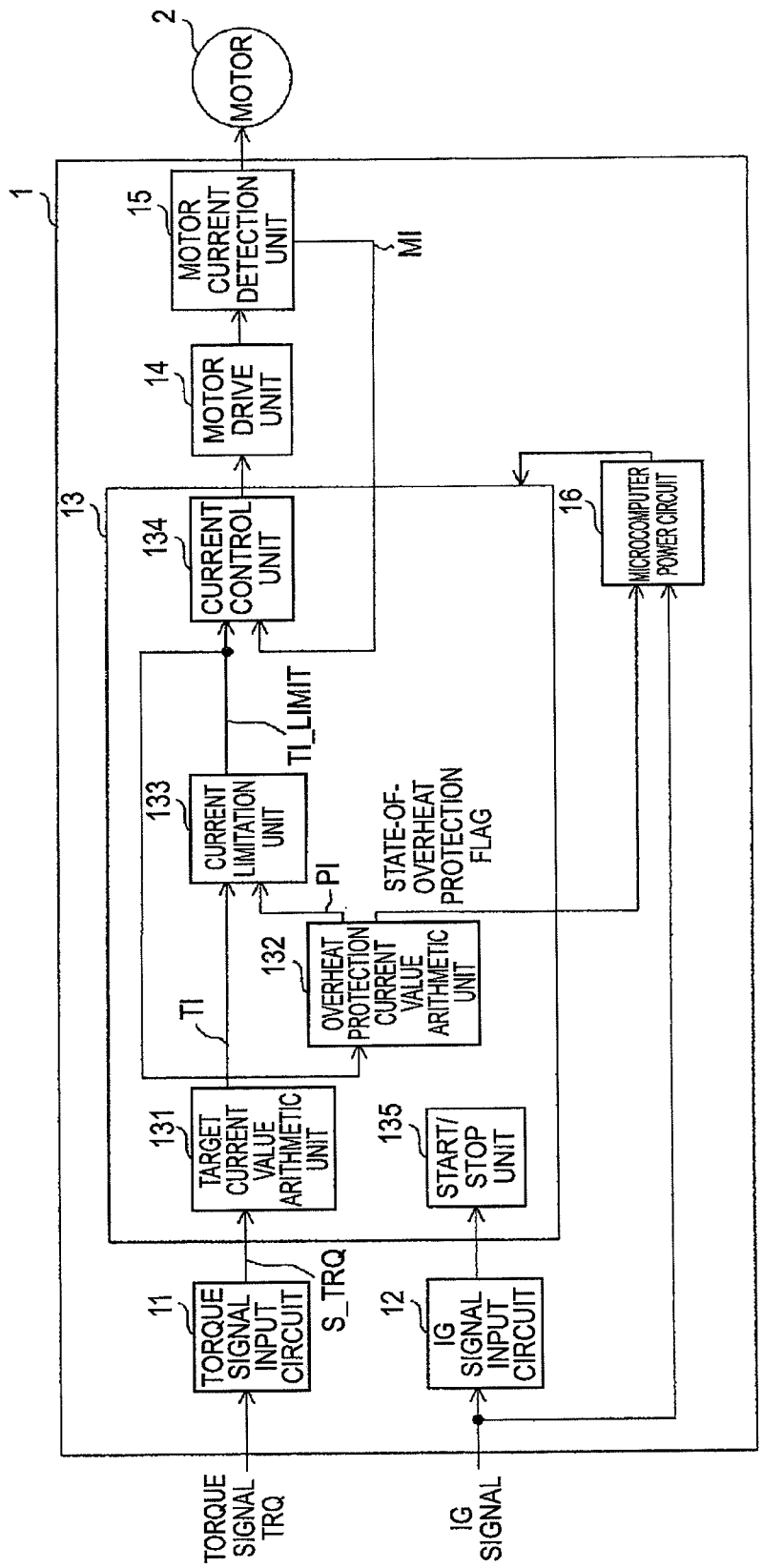
FIG. 1 is a control block diagram of an electric power steering system in accordance with an embodiment 1 of the present invention.

Referring to the drawings, an electric power steering system in accordance with an embodiment 1 of the present invention will be described below. FIG. 1 is a control block diagram of the electric power steering system in accordance with the embodiment 1 of the present invention. In FIG. 1, an ECU 1 is a control unit that drives or controls a motor 2, which applies an assistant torque to a steering shaft (not shown), on the basis of a signal sent from a vehicle such as a torque signal sent from a torque sensor (not shown) which measures a steering wheel torque exerted by a driver, or an IG signal representing a state of connection of an ignition switch (not shown).

The ECU 1 includes a torque signal input circuit 11, an IG signal input circuit 12, a microcomputer 13, a motor drive unit 14, a motor current detection unit 15, and a microcomputer power circuit 16. In the microcomputer 13, a target current value arithmetic unit 131, an overheat protection current value arithmetic unit 132, a current limitation unit 133, a current control unit 134, and a start/stop unit 135 are incorporated.

The torque signal input circuit 11 is a circuit that inputs a torque signal TRQ detected by a torque sensor, and includes a circuit that removes a high-frequency noise and a circuit that limits an input voltage range. The torque signal input circuit 11 outputs a torque signal S_TRQ on the basis of the torque signal TRQ detected by the torque sensor. The IG signal input circuit 12 is a circuit that inputs an IG signal representing a state of connection of an ignition switch, and includes a circuit that removes a high-frequency noise, and a circuit that limits an input voltage range.

The microcomputer 13 controls output of a signal, with which the motor 2 is driven, or start or stop of the electric power steering system on the basis of a signal sent from a vehicle, for example, a signal representing the driven state of the vehicle. The motor drive unit 14 outputs a current, with which the motor 2 is driven, on the basis of a motor driving signal outputted from the microcomputer 13. The motor current detection unit 15 measures a current conducted to the motor 2, and outputs a detected current value MI.

The microcomputer power circuit 16 is a circuit that controls a power supply, which feeds power to the microcomputer 13, according to an IG signal and a state-of-overheat protection flag outputted from the microcomputer 13. When the IG signal represents an on state or the state-of-overheat protection flag is set to 1, the power supply is turned on. When the IG signal represents an off state and the state-of-overheat protection flag is reset to 0, the power supply is turned off. When the microcomputer 13 does not operate, the state-of-overheat protection flag is reset to 0.

Figure 2:
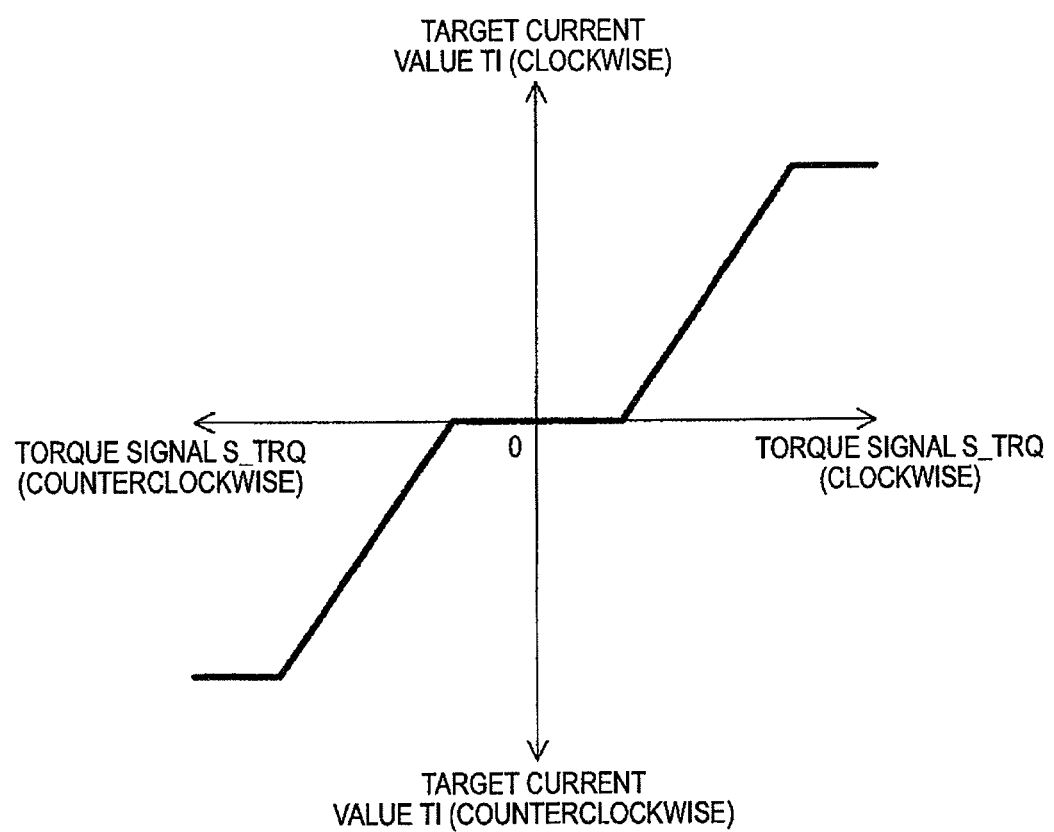
FIG. 2 is an explanatory diagram showing the relationship between a torque signal and a target current value established in the electric power steering system in accordance with the embodiment 1 of the present invention.

Next, an internal configuration of the microcomputer 13 will be described below. The target current value arithmetic unit 131 calculates a target current value TI on the basis of a torque signal S_TRQ inputted from the torque signal input circuit 11 to the microcomputer 13, and outputs the target current value TI. For calculation of the target current value TI, a property that is shown in FIG. 2 and will be described later is utilized, for example. In the embodiment 1 of the present invention, for a better understanding, what is inputted to the target current value arithmetic unit 131 is described to be the torque signal S_TRQ alone. A vehicle speed signal, a motor revolution speed signal or the like may be used to change the property of the target current value TI.

FIG. 2 is an explanatory diagram showing the relationship between a torque signal and a target current value which is established in the electric power steering system in accordance with the embodiment 1 of the present invention. In FIG. 2, the axis of ordinates indicates the target current value TI. A positive target current value TI is a target current value with which the motor 2 is driven in order to apply a clockwise assistant torque to the steering shaft, and a negative target current value TI is a target current value with which the motor 2 is driven in order to apply a counterclockwise assistant torque to the steering shaft. The axis of abscissas indicates the torque signal S_TRQ. A positive torque signal S_TRQ is a torque signal derived from a driver's clockwise turning of a steering wheel, and a negative torque signal S_TRQ is a torque signal derived from the driver's counterclockwise turning of the steering wheel.

As shown in FIG. 2, the target current value TI has a property described below. Namely, when the torque signal S_TRQ falls within a predetermined range, the target current value TI is proportional to the torque signal S_TRQ. When the torque signal S_TRQ falls below the predetermined range, the target current value TI is null. When the torque signal S_TRQ exceeds the predetermined range, the target current value TI is a constant value.

The overheat protection current value arithmetic unit 132 computes an overheat protection current value PI using a limited target current value TI_limit outputted from the current limitation unit 133 to be described later. When the computed overheat protection current value PI is lower than an upper limit value, the overheat protection current value arithmetic unit 132 sets the state-of-overheat protection flag to 1 and outputs it. When the overheat protection current value PI is equal to the upper limit value, the overheat protection current value arithmetic unit 132 resets the state-of-overheat protection flag to 0 and outputs it.

The current limitation unit 133 compares an absolute value of the target current value TI, which is calculated by the target current value arithmetic unit 131, with the overheat protection current value PI calculated by the overheat protection current value arithmetic unit 132. If the overheat protection current value PI is smaller than the target current value TI, the current limitation unit 133 limits the target current value TI so that the amount of current represented by the target current value TI becomes identical to that represented by the overheat protection current value PI. The limited target current value is outputted as a limited target current value TI_limit.

The current control unit 134 outputs a motor driving signal so that the detected current value MI measured by the motor current detection unit 15 can follow the limited target current value TI_limit outputted from the current limitation unit 133.

The start/stop unit 135 controls start and stop of the electric power steering system on the basis of the IG signal inputted to the microcomputer 13. When the IG signal represents an on state, the electric power steering system is started. When the IG signal represents an off state, the electric power steering system is stopped.

Figure 3:
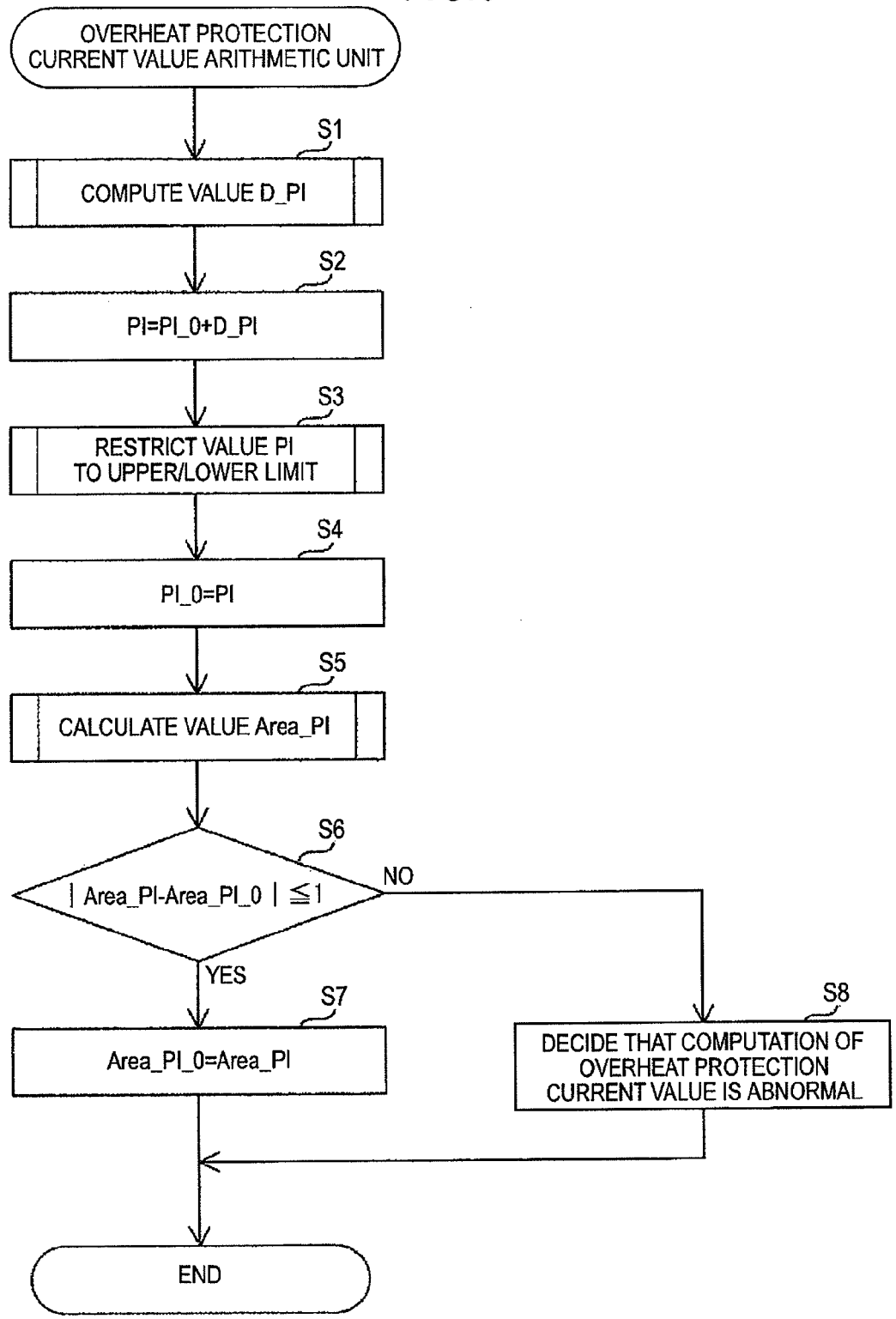
FIG. 3 is a flowchart concerning an overheat protection current value arithmetic unit included in the electric power steering system in accordance with the embodiment 1 of the present invention.

Next, the operation of the electric power steering system in accordance with the embodiment 1 of the present invention will be described below. FIG. 3 is a flowchart concerning the overheat protection current value arithmetic unit included in the electric power steering system in accordance with the embodiment 1 of the present invention. Processing described in the flowchart of FIG. 3 is executed at intervals of, for example, 10 msec while the electric power steering system is in operation.

Assume that PI denotes an overheat protection current value, P_0 denotes an immediately previous overheat protection current value, D_PI denotes a magnitude of an overheat protection current value change, Area_PI denotes a new value of an overheat protection current value domain, Area_PI_0 denotes an immediately previous value of the overheat protection current value domain. An initial overheat protection current value PI shall be set to a value larger than the maximum value of a current to be conducted to the motor 2.

Figure 4:
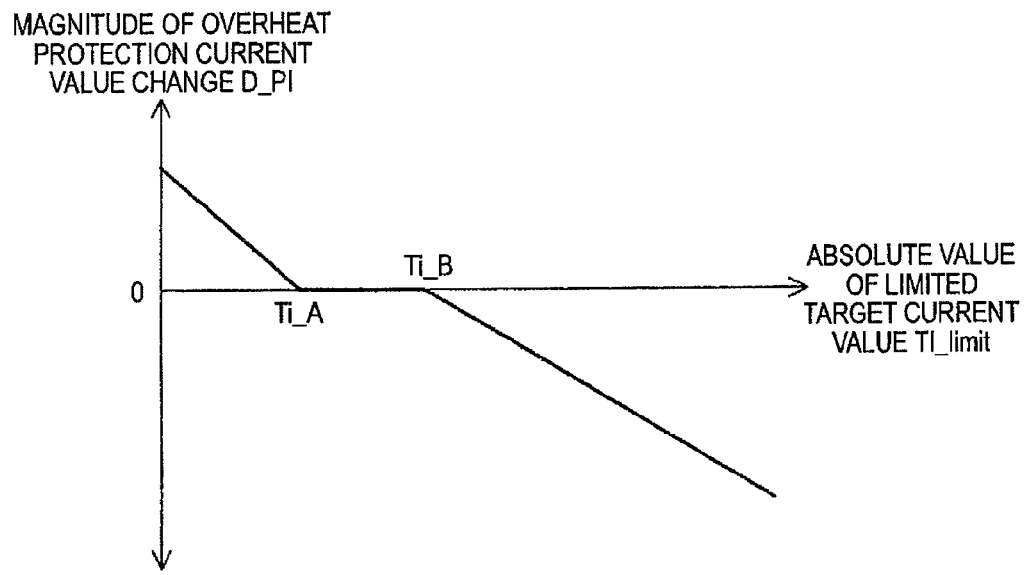
FIG. 4 is an explanatory diagram showing the relationship of a magnitude of an overheat protection current value change to a limited target current value established in the electric power steering system in accordance with the embodiment 1 of the present invention.

Referring to FIG. 3, at step S1, the magnitude of an overheat protection current value change D_PI is obtained based on the property of the magnitude of an overheat protection current value change D_PI with respect to the absolute value of the limited target current value TI_limit shown in FIG. 4. In other words, FIG. 4 is an explanatory diagram showing the relationship of the magnitude of an overheat protection current value change to the limited target current value which is established in the electric power steering system in accordance with the embodiment 1 of the present invention. The axis of ordinates indicates the magnitude of an overheat protection current value change D_PI, and the axis of abscissas indicates the absolute value of the limited target current value TI_limit.

In FIG. 4, a range of absolute values of the limited target current value TI_limit from 0 to a first predetermined value Ti_A corresponds to a domain in which a current conducted to the motor 2 is so small that the temperature of a heat dissipating region decreases. Therefore, in order to increase the overheat protection current value PI, the magnitude of an overheat protection current value change D_PI is set to a positive value. A range of the absolute values of the limited target current value TI_limit from the first predetermined value Ti_A to a second predetermined value Ti_B corresponds to a domain in which the temperature of the heat dissipating region remains unchanged. Therefore, the magnitude of an overheat protection current value change D_PI is set to 0. A range of the absolute values of the limited target current value TI_limit equal to or larger than the second predetermined value Ti_B corresponds to a domain in which the current conducted to the motor 2 is so large that the temperature of the heat dissipating region rises. Therefore, in order to decrease the overheat protection current value PI, the magnitude of an overheat protection current value change D_PI is set to a negative value.

Referring back to FIG. 3, at step S1, the magnitude of an overheat protection current value change D_PI is computed as mentioned above. At step S2, the magnitude of an overheat protection current value change D_PI obtained at step S1 is added to the immediately previous overheat protection current value P_0 in order to calculate the overheat protection current value PI.

At step S3, if a result of computation performed at step S2 demonstrates that the overheat protection current value PI is higher than an upper limit value of the overheat protection current value PI, the overheat protection current value PI is restricted to the upper limit value of the overheat protection current value PI. If the overheat protection current value PI gets lower than the lower limit value of the overheat protection current value PI, the overheat protection current value PI is restricted to the lower limit value thereof. In the embodiment 1, the upper limit value of the overheat protection current PI is equal to the initial value of the overheat protection current PI, and the lower limit of the overheat protection current PI is 0.

At step S4, in order to hold the computed overheat protection current value PI, the previous overheat protection current value P_0 is updated with the newly computed overheat protection current value PI. At step S5, a value Area_PI of an overheat protection current value domain to which the newly computed overheat protection current value PI belongs is calculated based on the settings shown in FIG. 5.

Figure 5:
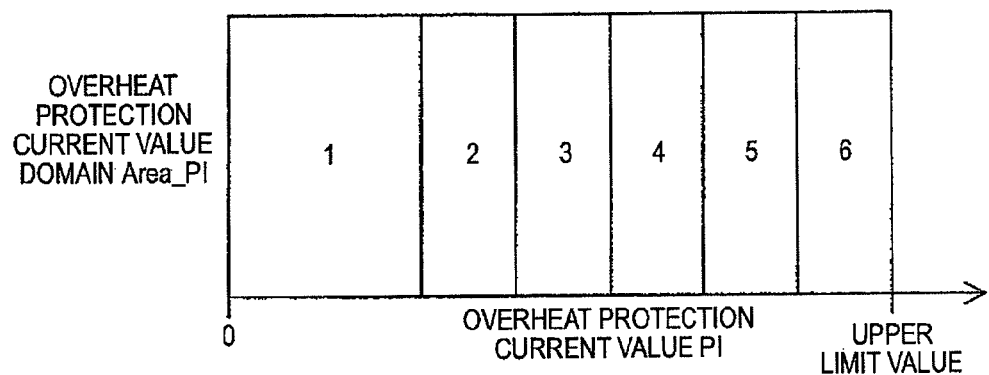
FIG. 5 is an explanatory diagram showing the relationship of an overheat protection current value domain to an overheat protection current value established in the electric power steering system in accordance with the embodiment 1 of the present invention.

FIG. 5 is an explanatory diagram showing the relationship of an overheat protection current value domain to an overheat protection current value which is established in the electric power steering system in accordance with the embodiment 1 of the present invention. A range of the overheat protection current values PI from 0 to the upper limit value is segmented into six sub-ranges, and the sub-ranges are designated as overheat protection current value domains indicated by values Area_PI of 1, 2, 3, 4, 5, and 6.

Referring back to FIG. 3, at step S5, the Area_PI of an overheat protection current value domain is calculated as mentioned above. At step S6, the Area_PI of the overheat protection current value domain calculated at step S5 is compared with the previous value Area_PI_0 of the overheat protection current value domain. In the present embodiment 1, when a result of the comparison is 1 or less (the domains are identical to each other or adjacent to each other), a decision is made that the overheat protection current value domain is normal (Yes). The processing proceeds to step S7. If the result of the comparison is 2 or more, a decision is made that the overheat protection current value domain is abnormal (No), and the processing proceeds to step S8.

At step S7, in order to hold the computed value Area_PI of the overheat protection current value domain, the previous value Area_PI_0 of the overheat protection current value domain is updated with the value Area_PI of the overheat protection current value domain. When the processing proceeds from step S6 to step S8, a decision is made that an abnormality has occurred in computation of the overheat protection current value PI. Processing of lighting a warning lamp or the like is performed in order to alarm a driver.

Next, a description will be made of overheat protection current value arithmetic processing to be performed in a case where computation of an overheat protection current value by the overheat protection current value arithmetic unit is normal and a normal operation can be performed. FIGS. 6A to 6D are timing charts showing actions to be performed in the electric power steering system in accordance with the embodiment 1 of the present invention in a case where computation of an overheat protection current value is normal. FIG. 6A shows the limited target current value TI_limit, FIG. 6B shows the magnitude of an overheat protection current value change D_PI, FIG. 6C shows the overheat protection current value PI, and FIG. 6D shows a state-of-overheat protection flag.

Referring to FIGS. 6A to 6D, a steering wheel is at a neutral position by a time t1, and the limited target current value TI_limit shown in FIG. 6A is 0. Therefore, the magnitude of an overheat protection current value change D_PI shown in FIG. 6B is set to the aforesaid positive predetermined value in line with the property shown in FIG. 4. At this time, the overheat protection current value PI shown in FIG. 6C equals an initial value, that is, the upper limit value, and the value Area_PI of the overheat protection current value domain is 6. The state-of-overheat protection flag shown in FIG. 6D is reset to 0.

Assuming that a driver begins turning the steering wheel clockwise beyond the neutral position, the limited target current value TI_limit begins increasing. When the limited target current value TI_limit reaches the first predetermined value Ti_A at a time t2, the magnitude of an overheat protection current value change D_PI equals 0 in line with the property shown in FIG. 4. At this time, the overheat protection current value PI is still equal to the upper limit value, and the state-of-overheat protection flag is still 0.

Thereafter, when the limited target current value TI_limit reaches the second predetermined value Ti_B at a time t3, the magnitude of an overheat protection current value change D_PI is changed from 0 to a negative value in line with the property shown in FIG. 4. The overheat protection current value PI decreases from the upper limit value. Accordingly, the state-of-overheat protection flag is set to 1.

During a period from the time t3 to a time t4, the limited target current value TI_limit changes within the range equal to or larger than the second predetermined value Ti_B. Along with the change, the magnitude of an overheat protection current value change D_PI changes within a range of negative values. Meanwhile, since the magnitude of an overheat protection current value change D_PI takes on a negative value, the overheat protection current value PI keeps decreasing, as shown in FIG. 6C, from the upper limit value, and the value Area_PI of an overheat protection current value domain shifts from 6 to 5.

When the time t4 comes, the limited target current value TI_limit becomes equal to or smaller than the second predetermined value Ti_B. During a period from the time t4 to a time t5, the limited target current value TI_limit equals a value ranging from the first predetermined value Ti_A to the second predetermined value Ti_B. The magnitude of an overheat protection current value change D_PI takes on 0, and the overheat protection current value PI remains unchanged.

During a period from the time t5 to a time t6, the limited target current value TI_limit decreases from the first predetermined value Ti_A and reaches 0. Accordingly, the magnitude of an overheat protection current value change D_PI begins increasing at the time t5 in line with the property shown in FIG. 4 while taking on positive values, and reaches a maximum value (initial value) at a time t6. During a period from the time t5 to the time t6, since the magnitude of an overheat protection current value change D_PI increases while taking on positive values, the overheat protection current value PI increases as shown in FIG. 6C.

Thereafter, when the driver turns the steering wheel counterclockwise at the time t6, the limited target current value TI_limit begins increasing in a negative direction. Along with an increase in the absolute value, the magnitude of an overheat protection current value change D_PI decreases from the maximum value as shown in FIG. 4. At a time t7, the limited target current value TI_limit reaches a first negative predetermined value Ti_A. Accordingly, the magnitude of an overheat protection current value change D_PI takes on 0 in line with the property shown in FIG. 4, and the overheat protection current value PI remains unchanged as shown in FIG. 6C.

At a time t8, the limited target current value TI_limit reaches the second negative predetermined value Ti_B. During a period from the time t8 to a time t9, the limited target current value TI_limit changes within a range equal to or larger than the second negative predetermined value Ti_B. Along with the change, the magnitude of an overheat protection current value change D_PI changes within a range of negative values. Meanwhile, since the magnitude of an overheat protection current value change D_PI takes on a negative value, the overheat protection current value PI keeps decreasing as shown in FIG. 6C. The Area_PI of an overheat protection current value domain sequentially changes from 5 to 4, from 4 to 3, and from 3 to 2.

During a period from the time t9 to a time t10, the limited target current value TI_limit equals an intermediate value between the second negative predetermined value Ti_B and the first negative predetermined value Ti_A. Therefore, during the period, the magnitude of an overheat protection current value change D_PI takes on 0, the overheat protection current value PI remains unchanged, and the value Area_PI of the overheat protection current value domain is retained at 2.

During a period from the time t10 to a time t11, the limited target current value TI_limit decreases from the first negative value Ti_A to 0. Accordingly, the magnitude of an overheat protection current value change D_PI increases from 0 to the maximum value (initial value). During the period, the overheat protection current value PI begins increasing.

At the time t11, the driver ceases steering and the steering wheel is held at the neutral position. Therefore, the limited target current value TI_limit equals 0, and the state is retained after the time t11. Since the magnitude of an overheat protection current value change D_PI is retained at the maximum value, the overheat protection current value PI continuously increases as shown in FIG. 6C, and reaches the upper limit value at a time t12. The Area_PI of an overheat protection current value domain sequentially changes from 2 to 3, from 3 to 4, from 4 to 5, and from 5 to 6 during a period from the time t10 to the time 12. The state-of-overheat protection flag is, as shown in FIG. 6D, retained at 1 during a period from the time t3 to the time t12.

As long as the computation of an overheat protection current value by the overheat protection current value arithmetic unit 132 is normal, the overheat protection current value PI changes within a range of values which the magnitude of an overheat protection current value change D_PI can take on. The width of each overheat protection current value domain indicated by the value Area_PI is set to a width larger than the range of values which the magnitude of an overheat protection current value change D_PI can take on. Therefore, the Area_PI of an overheat protection current value domain will not make such a change, for example, from 2 directly to 5 that a domain is changed to a domain beyond an adjoining domain.

The current limitation unit 133 compares, as mentioned above, the absolute value of the target current value TI, which is calculated by the target current value arithmetic unit 131, with the overheat protection current value PI calculated by the overheat protection current value arithmetic unit 132. If the overheat protection current value PI is smaller than the target current value TI, the target current value TI is limited so that an amount of current represented by the target current value TI becomes identical to that represented by the overheat protection current value PI. The limited target current value is outputted as the limited target current value TI_limit. The current control unit 134 outputs a motor driving signal so that the detected current value MI measured by the motor current detection unit 15 can follow the limited target current value TI_limit outputted from the current control unit 133.

The electric power steering system estimates a temperature rise derived from heat dissipation by the heat dissipating regions of an ECU and the motor using, for example, a cumulative value of a current conducted to the motor 2. After feed of power to the motor is discontinued, a time it takes to turn off the power supply of a control unit is computed based on the estimated temperature rise. After the computed time elapses, control is extended in order to turn off the power supply of the control unit, for example.

Figure 6:
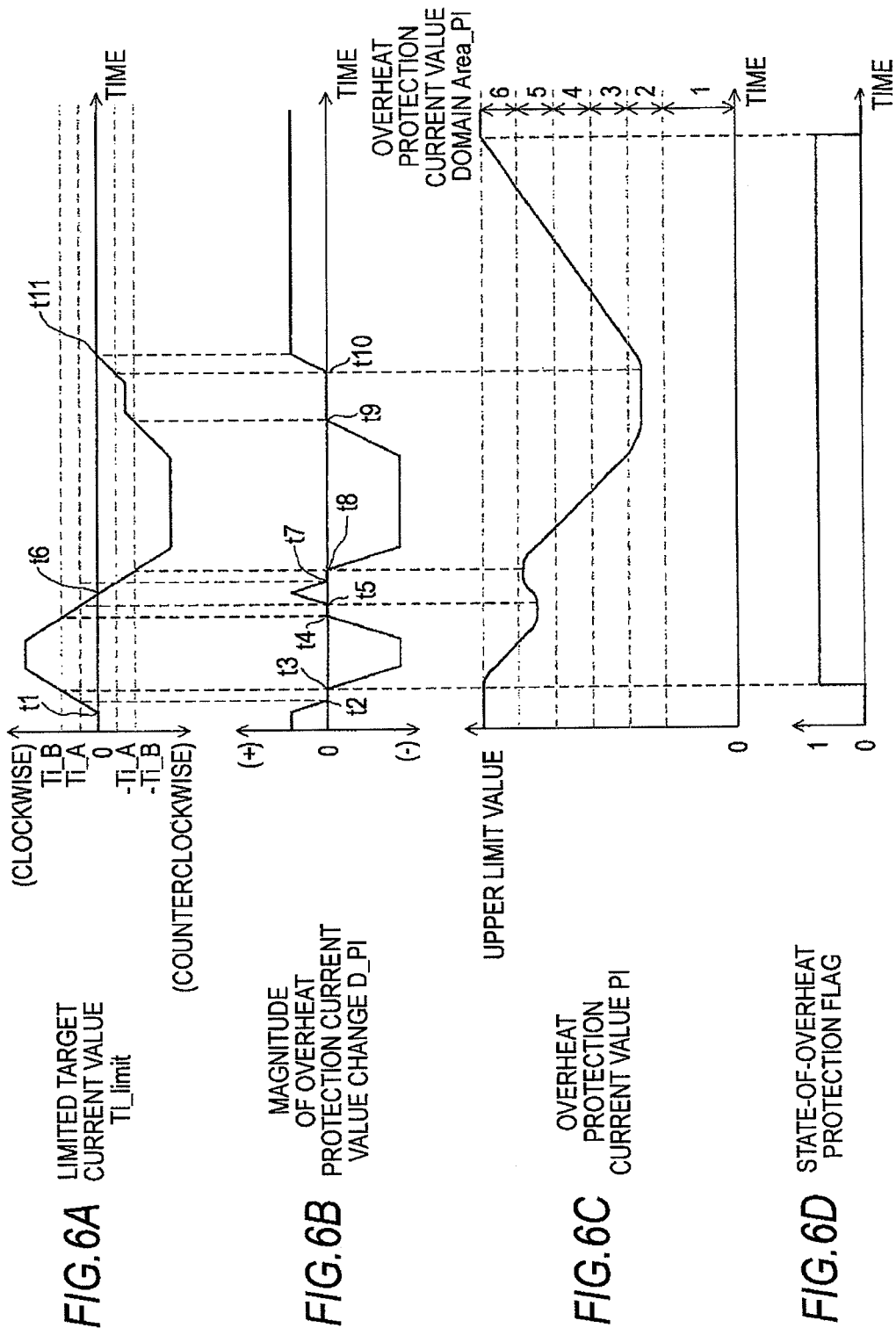
FIGS. 6A to 6D are timing charts showing actions to be performed in the electric power steering system in accordance with the embodiment 1 of the present invention in a case where computation of an overheat protection current value is normal.
Figure 7:
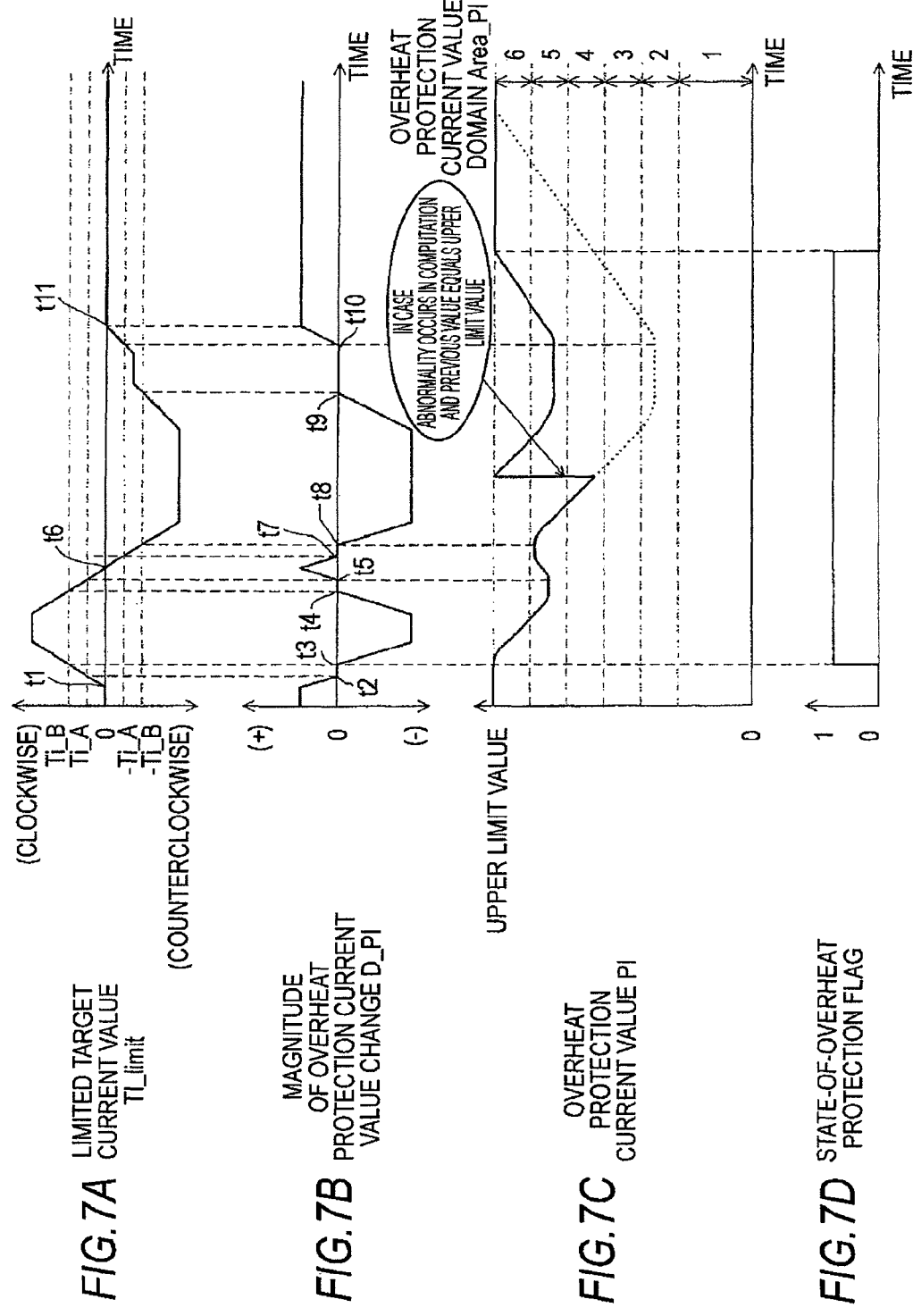
FIGS. 7A to 7D are timing charts showing actions to be performed in the electric power steering system in accordance with the embodiment 1 of the present invention in a case where an abnormality occurs in computation of an overheat protection current value and a limit value becomes an upper limit value.

Next, a description will be made of actions to be performed in a case where at step S2 in FIG. 3, an abnormality that the previous overheat protection current value P_0 has changed to the upper limit value occurs. FIGS. 7A to 7D are timing charts showing the actions to be performed in a case where an abnormality occurs in computation of an overheat protection current value, and a limit value equals an upper limit value in the electric power steering system in accordance with the embodiment 1 of the present invention. In FIGS. 7A to 7D, the same reference numerals as those in FIGS. 6A to 6D are assigned to parts identical or equivalent to those shown in FIGS. 6A to 6D. In FIG. 7C, a waveform indicated with a dotted line represents a wave obtained in a normal situation as shown in FIG. 6C.

Referring to FIGS. 7A to 7D, during a period from a time t8 to a time t9, the previous value Area_PI_0 of an overheat protection current value domain that immediately precedes the value Area_PI is 4. At this time, assuming that an abnormality occurs in a RAM in which the previous overheat protection current value PI_0 immediately preceding the overheat protection current value PI is stored, if the previous value PI_0 immediately preceding the overheat protection current value PI is changed to the upper limit value, the overheat protection current value PI equals a value obtained by adding the value D_PI to the upper limit value of the overheat protection current value. The value Area_PI of an overheat protection current value domain is set to 6. Namely, the value Area_PI of an overheat protection current value domain is changed from 4 directly to 6.

As a result, at step S6 in FIG. 3, the difference between the value Area_PI of an overheat protection current value domain and the previous value Area_PI_0 thereof becomes 2. The processing branches out to step S8, and a decision is made that computation of an overheat protection current value is abnormal.

As mentioned above, when the overheat protection current value PI is abruptly changed to increase and a limit current value to which a target current value is limited is changed to get larger, overheat protection is not achieved satisfactorily. A current to be conducted to the motor 2 may get larger than the one in a normal situation. There arises a possibility that the ECU or motor may be damaged. Therefore, at step S8 in FIG. 3, a decision is made that computation of an overheat protection current value is abnormal, and a driver is notified of the abnormality by lighting a warning lamp or the like.

Figure 8:
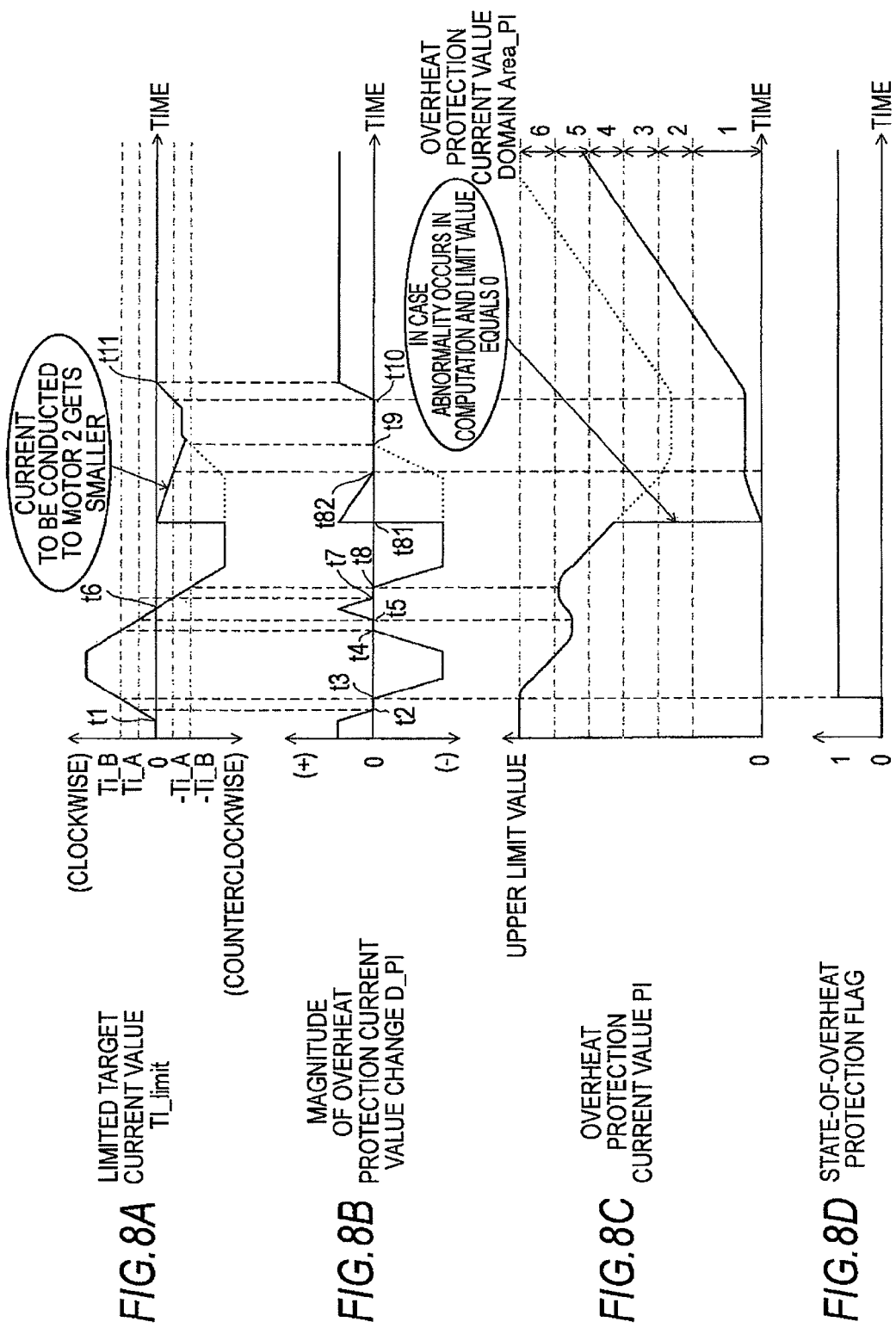
FIGS. 8A to 8D are timing charts showing actions to be performed by the electric power steering system in accordance with the embodiment 1 of the present invention in a case where an abnormality occurs in computation of an overheat protection current value and a limit value becomes null.

Next, a description will be made of actions to be performed in a case where at step S2 in FIG. 3, an abnormality that a result of computation of the overheat protection current value PI is 0 occurs with the target current value TI limited with the overheat protection current value PI. FIGS. 8A to 8D are timing charts showing the actions to be performed in the electric power steering system in accordance with the embodiment 1 of the present invention in a case where an abnormality occurs in computation of an overheat protection current value and a limit value equals 0. In FIGS. 8A to 8D, the same reference numerals as those shown in FIGS. 6A to 6D are assigned to parts identical or equivalent to those shown in FIGS. 6A to 6D. In FIGS. 8A, 8B, and 8C, waveforms indicated with dotted lines represent waves obtained in a normal situation as shown in FIGS. 6A, 6B, and 6C.

In FIGS. 8A to 8D, during a period from a time t8 to a time t9, the previous value Area_PI_0 of an overheat protection current value domain is 4. Assuming that an abnormality occurs in a RAM in which the previous value PI_0 immediately preceding the overheat protection current value PI is stored, and that the overheat protection current value PI equals 0, the Area_PI of an overheat protection current value domain is immediately changed from 4 to 1.

As a result, at step S6 in FIG. 3, the difference between the value Area_PI of an overheat protection current value domain and the previous value Area_PI_0 thereof becomes 3. The processing branches out to step S8, and a decision is made that computation of an overheat protection current value is abnormal.

As mentioned above, when the overheat protection current value PI is abruptly changed to decrease and a limit current value to which a target current value is limited is changed to get smaller, overheat protection may be excessively performed and a current to be conducted to the motor 2 may become smaller than that in a normal situation. There arises a possibility that a driver's steering effort may not be fully alleviated. Therefore, at step S8 in FIG. 3, a decision is made that computation of an overheat protection current value is abnormal, and the driver is notified of the abnormality by lighting a warning lamp or the like.

As mentioned above, according to the electric power steering system in accordance with the embodiment 1 of the present invention, the overheat protection current value arithmetic unit 132 compares a new value of information relevant to an overheat protection current value with a previous value thereof. If the difference between the new value and previous value is large, a decision is made that an abnormality has occurred in computation of the overheat protection current value. Since overheat protection may not be fully performed and a current to be conducted to the motor 2 may be larger than that in a normal situation, the ECU or motor may be damaged. Otherwise, the overheat protection may be excessively performed, and the current to be conducted to the motor 2 may be smaller than that in the normal situation. Accordingly, an abnormal incident, for example, that a driver's steering effort is not fully alleviated can be avoided.

In the foregoing embodiment 1, as the information relevant to an overheat protection current limit value, the value of any of six domains into which a range of values to which the overheat protection current limit value may become equal is divided is adopted. The number of divisions may be altered or the overheat protection current limit value itself may be adopted.

Embodiment 2

Next, an electric power steering system in accordance with an embodiment 2 of the present invention will be described below. In the foregoing embodiment 1, if a decision is made that an abnormality has occurred in computation of an overheat protection current value, processing such as lighting of a warming lamp is carried out. The electric power steering system in accordance with the embodiment 2 calculates an overheat protection current value on the basis of information relevant to a previously computed overheat protection current value, and uses the calculated value as a new overheat protection current value.

Figure 9:
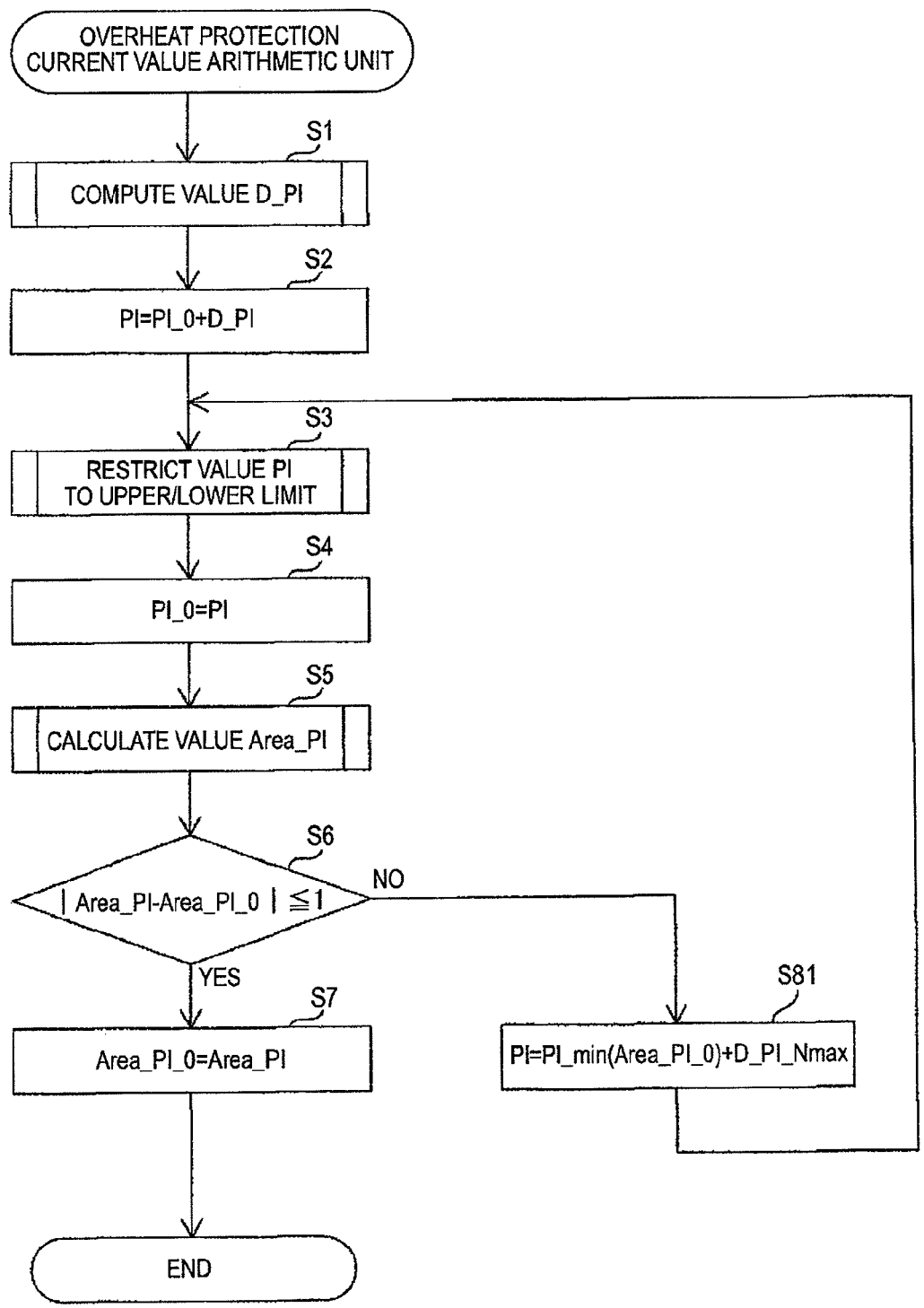
FIG. 9 is a flowchart concerning an overheat protection current value arithmetic unit included in an electric power steering system in accordance with an embodiment 2 of the present invention.

FIG. 9 is a flowchart concerning an overheat protection current value arithmetic unit included in the electric power steering system in accordance with the embodiment 2 of the present invention. The flowchart shown in FIG. 9 is what is obtained by changing step S8 in the flowchart concerning the embodiment 1 shown in FIG. 3 into step S81. The other steps are identical to those shown in FIG. 3.

Referring to FIG. 9, actions of steps S1 to S7 are identical to those shown in FIG. 3. An iterative description will be omitted. If a decision is made at step S6 that a result of computation of an overheat protection current value PI is abnormal, the processing branches out to step S81. Since the result of computation of the overheat protection current value PI is abnormal, the overheat protection current value PI, the previous overheat protection current value PI_0, and the magnitude of an overheat protection current value change D_PI shall not be usable at step S81.

At step S81, PI_min (Area_PI_0) shall denote a minimum current value of a domain indicated by the previous value Area_PI_0 of an overheat protection current value domain, and D_PI_Nmax shall denote a negative maximum value which the magnitude of an overheat protection current value change D_PI may take on. At step S81, the overheat protection current value PI is calculated using the previous value Area_PI_0 of an overheat protection current value domain. As a minimum value of the new current overheat protection current value PI inferred from the previous value Area_PI_0 of an overheat protection current value domain, the overheat protection current value PI is obtained according to an equation (1) below, and the processing proceeds to step S3.

$$PI = PI\_min(Area\_PI\_0) + D\_PI\_Nmax \quad (1)$$

Figure 10:
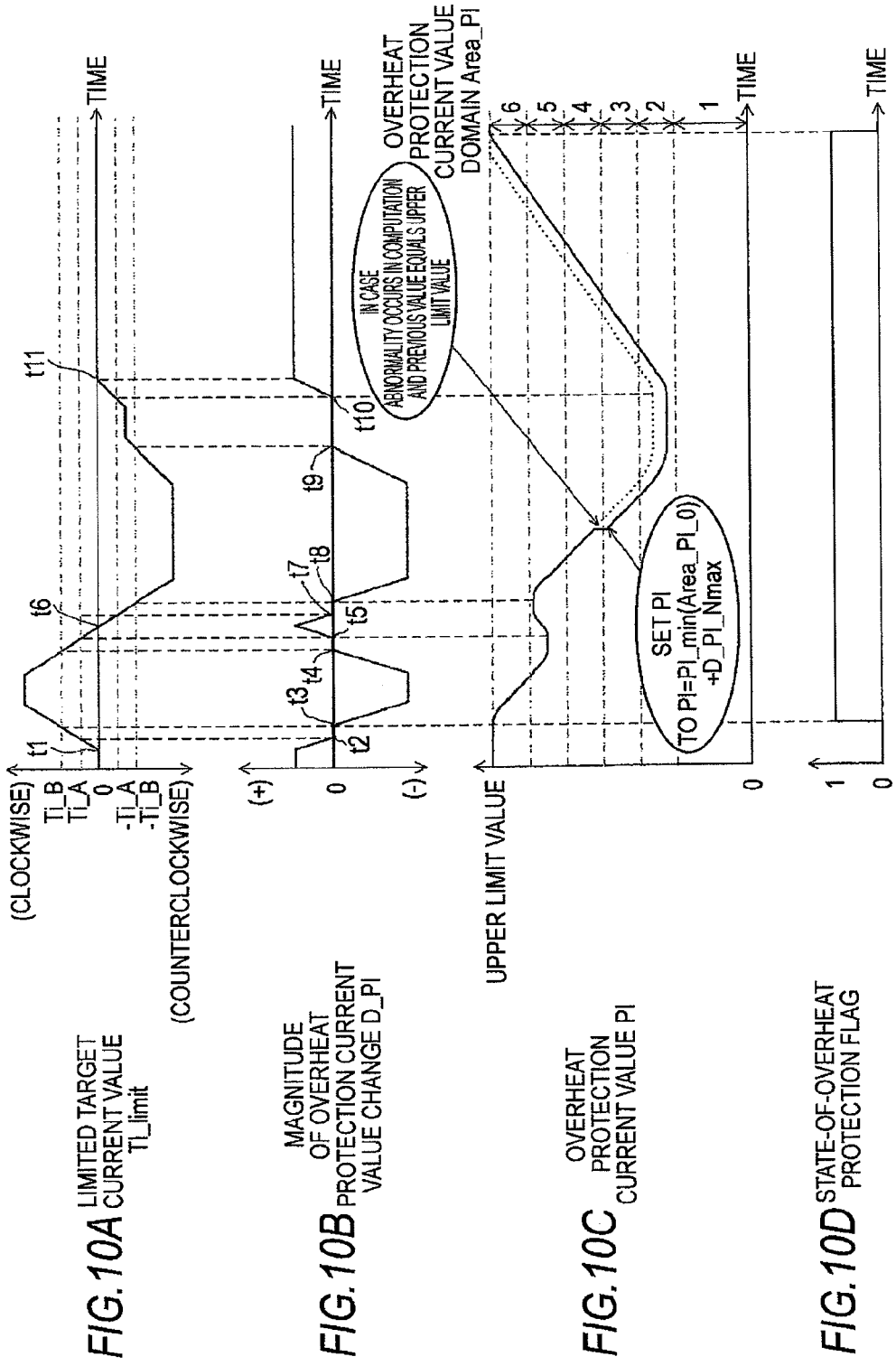
FIGS. 10A to 10D are timing charts showing actions to be performed in the electric power steering system in accordance with the embodiment 2 of the present invention in a case where an abnormality occurs in computation of an overheat protection current value and a limit value becomes an upper limit value.

FIGS. 10A to 10D are timing charts showing actions to be performed in the electric power steering system in accordance with the embodiment 2 of the present invention in a case where an abnormality occurs in computation of an overheat protection current value and a limit value equals an upper limit value. FIGS. 10A to 10D show the case where when limitation based on the overheat protection current value PI is imposed, an abnormality that the previous overheat protection current value PI_0 is changed to the upper limit value has occurred at step S2 in FIG. 9. In FIGS. 10A to 10D, the same reference numerals as those shown in FIG. 6 are assigned to parts identical or equivalent to those shown in FIG. 6. In FIGS. 10A, 10B, and 10C, waveforms indicated with dotted limes represent waves obtained in a normal situation shown in FIG. 6.

As shown in aforementioned FIGS. 7A to 7D, when the previous value Area_PI_0 of an overheat protection current value domain is 4, if an abnormality occurs in a RAM in which the previous overheat protection current value PI_0 is stored, the previous overheat protection current value PI_0 is changed to the upper limit value thereof. In this case, the overheat protection current value PI equals a value obtained by adding the value D_PI to the upper limit value thereof. The value Area_PI of an overheat protection current value domain becomes 6. As a result, at step S6 in FIG. 9, the difference between the value Area_PI of an overheat protection current value domain and the previous value Area_PI_0 thereof becomes 2. Accordingly, the processing branches out to step S81 in FIG. 10.

At step S81, the overheat protection current value PI is obtained as the sum of a value PI_min (Area_PI_0) and a value D_PI_Nmax. As shown in FIG. 10C, the overheat protection current value PI is smaller than that obtained in a normal situation. However, the overheat protection current value PI is set to a value that does not largely affect a facility which alleviates a driver's steering effort.

As mentioned above, according to the electric power steering system in accordance with the embodiment 2 of the present invention, even if an abnormality that the previous overheat protection current value PI_0 is changed to the upper limit value thereof occurs, the electric power steering system operates to normally carry out overheat protection for fear a driver may be adversely affected.

Embodiment 3

Next, an electric power steering system in accordance with an embodiment 3 of the present invention will be described below. In the foregoing embodiment 2, an overheat protection current value is calculated based on pieces of information relevant to previously computed overheat protection current values, and the calculated overheat protection current value is used as a new overheat protection current value. In the electric power steering system in accordance with the embodiment 3 of the present invention, the overheat protection current value is calculated based on pieces of information relevant to several previously computed overheat protection current values, and the calculated overheat protection current value is used as the new overheat protection current value. Herein, a case where the overheat protection current value is calculated based on pieces of information relevant to three previously computed overheat protection current values will be described below.

Figure 11:
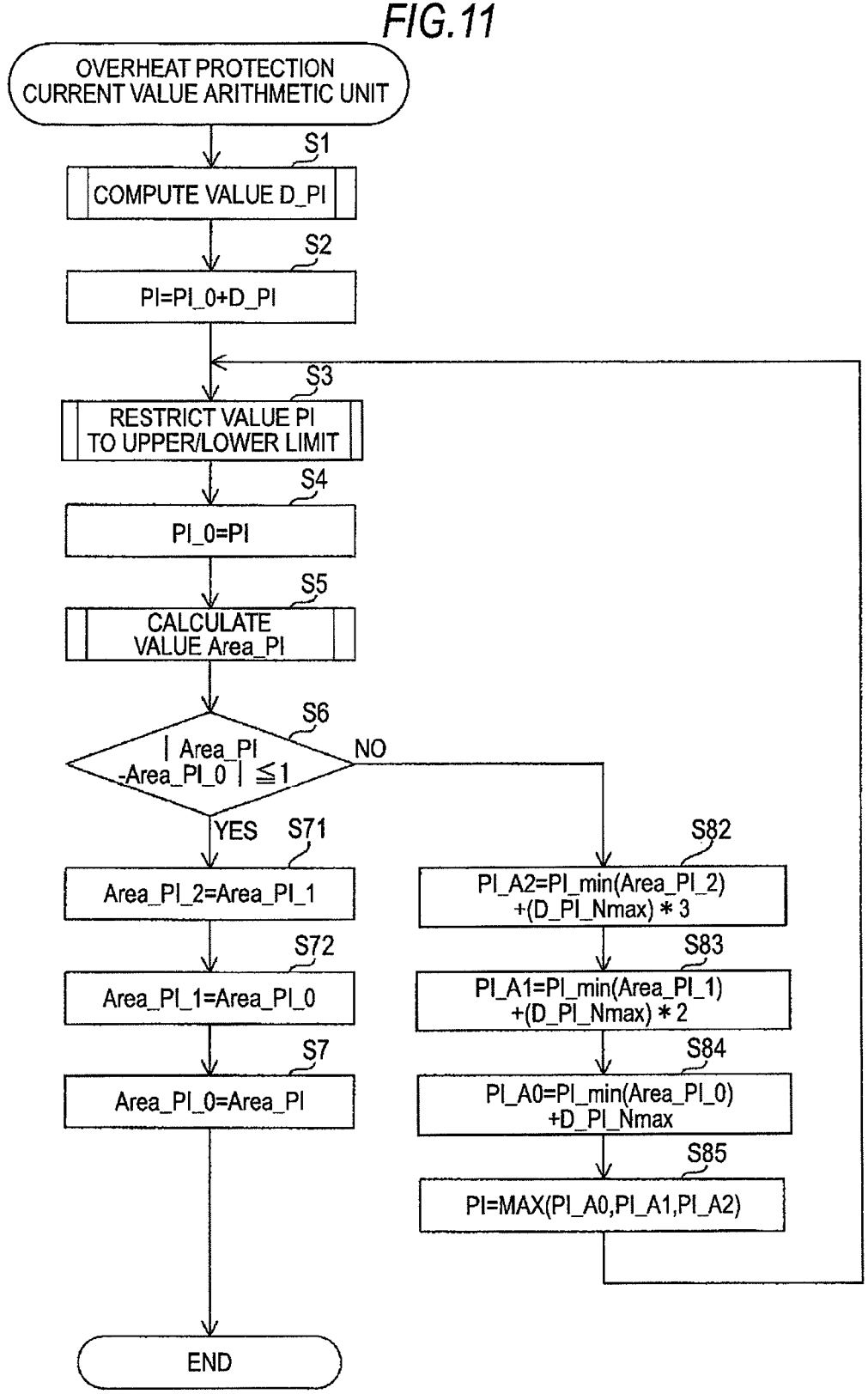
FIG. 11 is a flowchart concerning an overheat protection current value arithmetic unit included in an electric power steering system in accordance with an embodiment 3 of the present invention.

FIG. 11 is a flowchart concerning an overheat protection current value arithmetic unit included in the electric power steering system in accordance with the embodiment 3 of the present invention. The flowchart shown in FIG. 11 is what is obtained by modifying step S6 and subsequent steps in the flowchart concerning the embodiment 1 shown in FIG. 3. Herein, Area_PI_1 shall denote a value preceding one immediately previous value of an overheat protection current value domain, Area_PI_2 shall denote a value preceding two immediately previous values thereof, PI_min (Area_PI_1) shall denote a minimum current value included in a domain indicated by the value Area_PI_1 preceding one immediately previous value of the overheat protection current value domain, and PI_min (Area_PI_2) shall denote a minimum current value included in a domain indicated by the value Area_PI_2 preceding two immediately previous values of the overheat protection current value domain. In addition, PI_A0 shall denote a result of computation of an overheat protection current value using the immediately previous value, PI_A1 shall denote a result of computation of the overheat protection current value using the value preceding the immediately previous value, and PI_A2 shall denote a result of computation of the overheat protection current value using the value preceding two immediately previous values.

Referring to FIG. 11, actions of steps S1 to S6 are identical to those described in conjunction with FIG. 3. An iterative description will be omitted. If a decision is made at step S6 that a result of computation of the overheat protection current value PI is normal (Yes), the processing branches out to step S71. If a decision is made that the result of computation of the overheat protection current value PI is abnormal (No), the processing branches out to step S82.

If a decision is made at step S6 that the result of computation of the overheat protection current value PI is normal (Yes), the processing proceeds to step S71. At step S71, first, the value Area_PI_2 preceding two immediately previous values of an overheat protection current value domain is updated with the value Area_PI_1 preceding the immediately previous value of the overheat protection current value domain.

Thereafter, at step S72, the value Area_PI_1 preceding the immediately previous value of the overheat protection current value domain is updated with the immediately previous value Area_PI_0 of the overheat protection current value domain.

At step S7, the immediately preceding value Area_PI_0 of the overheat protection current value domain is updated with the value Area_PI of the overheat protection current value domain.

By performing the foregoing steps S71, S72, and S7, the three values of an overheat protection current value domain are preserved.

In contrast, if a decision is made at step S6 that the result of computation of the overheat protection current value PI is abnormal (No), the processing branches out to step S82. At step S82, first, an overheat protection current value PI_A2 is calculated based on the value Area_PI_2 preceding two immediately previous values of an overheat protection current value domain. As a minimum value of the new overheat protection current value PI inferred from the value Area_PI_2 preceding two immediately previous values of the overheat protection current value domain, the overheat protection current value PI_A2 is computed according to an equation (2) below. For the computation, since the value preceding two immediately previous values of the overheat protection current value domain is used, it must take into consideration that a magnitude of a change provided as the magnitude of an overheat protection current value change D_PI is three time larger at most. After the completion of the computation, the processing proceeds to step S83.

$$PI\_A2 = PI\_\min(Area\_PI\_2) + (D\_PI\_N\max)*3 \qquad (2)$$

At step S83, an overheat protection current value PI_A1 is calculated based on the value Area_PI_1 preceding the immediately previous value of the overheat protection current value domain. As a minimum value of the new overheat protection current value PI inferred from the value Area_PI_1 preceding the immediately previous value of the overheat protection current value domain, the overheat protection current value PI_A1 is computed according to an equation (3) below. For the computation, the value preceding the immediately previous value of the overheat protection current value domain is used. Therefore, a consideration should be taken into the fact that a magnitude of a change provided as the magnitude of an overheat protection current value change D_PI is twice larger at most. After the completion of the computation, the processing proceeds to step S84.

$$PI\_A1 = PI\_\min(Area\_PI\_1) + (D\_PI\_N\max)*2 \qquad (3)$$

At step S84, an overheat protection current value PI_A0 is calculated based on the immediately previous value Area_PI_0 of the overheat protection current value domain. As a minimum value of the new overheat protection current value PI inferred from the immediately previous value Area_PI_0 of the overheat protection current value domain, the overheat protection current value PI_A0 is computed according to an equation (4) below. The processing then proceeds to step S85.

$$PI\_A0 = PI\_\min(Area\_PI\_0) + D\_PI\_N\max \qquad (4)$$

At step S85, the largest one of the overheat protection current value PI_A2, overheat protection current value PI_A1, and overheat protection current value PI_A0 obtained at steps S82, S83, and S84 respectively is recognized as the overheat protection current value PI. The processing then returns to step S3, and the foregoing actions are repeated.

Figure 12:
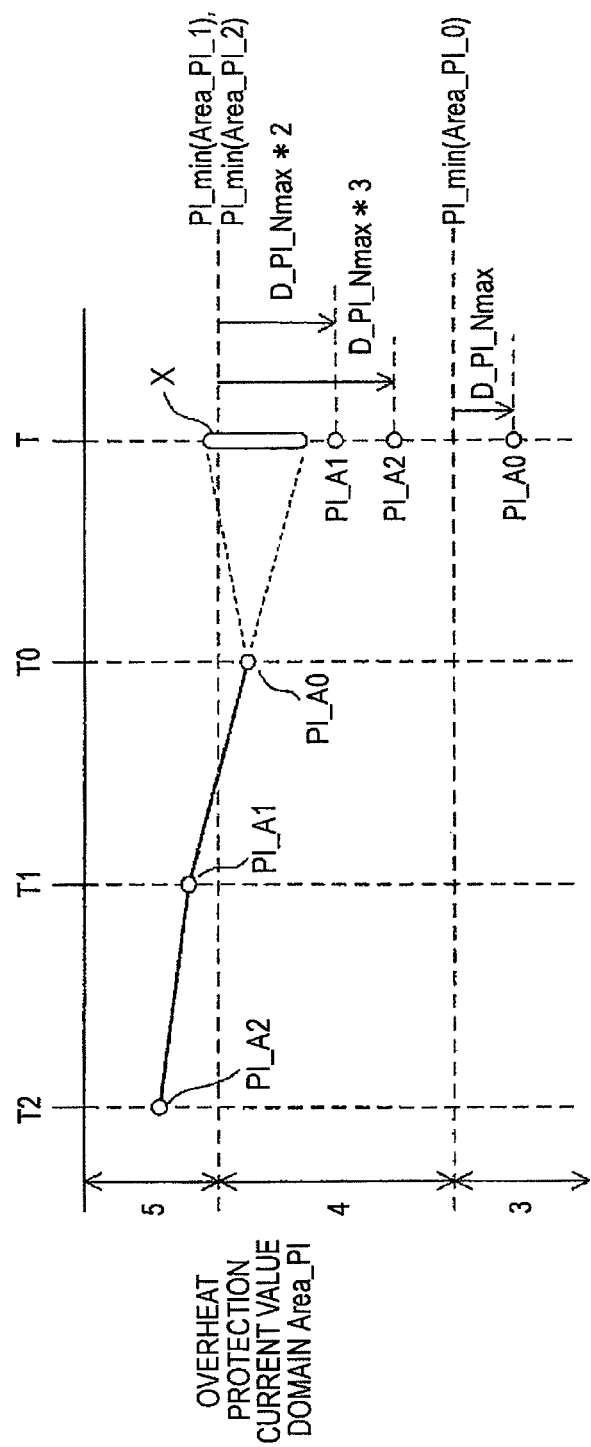
FIG. 12 is an explanatory diagram showing actions to be performed in the electric power steering system in accordance with the embodiment 3 of the present invention in a case where an abnormality occurs in computation of an overheat protection current value, and an overheat protection current value is calculated from a previous value of an overheat protection current value domain.

FIG. 12 is an explanatory diagram showing an action of calculating an overheat protection current value from a previous value of an overheat protection current value domain which is performed in the electric power steering system in accordance with the embodiment 3 of the present invention in a case where an abnormality occurs in computation of an overheat protection current value. FIG. 12 shows an example of an actual action. In FIG. 12, T2 denotes the timing of computing the overheat protection current value PI_A2 on the basis of the value Area_PI_2 preceding two immediately previous values of the overheat protection current value domain, T1 denotes the timing of computing the overheat protection current value PI_A1 on the basis of the value Area_PI_1 preceding the immediately previous value of the overheat protection current value domain, T0 denotes the timing of computing the overheat protection current value PI_A0 on the basis of the immediately previous value Area_PI_2 of the overheat protection current value domain, and T denotes the timing of computing the new overheat protection current value. X denotes a range of values to which the overheat protection current value PI may become equal when computation is normal.

In FIG. 12, the value Area_PI of the overheat protection current value domain to which the overheat protection current value PI_A0 belongs and which is obtained through the immediately previous computation shall be 4. Each of the value Area_PI of the overheat protection current value domain to which the overheat protection current value PI_A1 belongs and which is obtained through the computation preceding the immediately previous computation, and the value Area_PI of the overheat protection current value domain to which the overheat protection current value PI_A2 belongs and which is obtained through the computation preceding two immediately previous computations shall be 5. The range indicated by the value Area_PI of 4 of the overheat protection current value domain shall be sufficiently wide for the maximum value D_PI_Nmax of the magnitude of an overheat protection current value change D_PI.

At this time, if a decision is made that the new computation performed at the timing T is abnormal, a minimum value of an overheat protection current value domain obtained through the immediately previous computation performed at the timing T0 is a value PI_min (Area_PI_0). Minimum values of the overheat protection current value domain obtained through the computation that precedes the immediately previous computation and is performed at the timing T1, and the computation that precedes the two immediately previous computations and is performed at the timing 12 are values PI_min (Area_PI_1) and PI_min (Area_PI_2). The minimum value of the overheat protection current value domain obtained through the previous computation is smaller than the minimum values of the overheat protection current value domain which are obtained through the computation preceding the immediately previous computation and the computation preceding the two immediately previous computations. Even when it is taken into consideration that the magnitude of an overheat protection current value change D_PI, the overheat protection current value PI_A1 obtained using the value preceding the immediately previous value is the closest to the range X of values to which the overheat protection current value PI may become equal in a normal situation.

As mentioned above, according to the electric power steering system in accordance with the embodiment 3 of the present invention, when a value closest to a value in a normal situation is selected from among overheat protection current values calculated from plural pieces of previous information, the electric power steering system capable of reducing an adverse effect on a driver can be realized.

If a decision is made that an abnormal value is contained in the pieces of previous information, the abnormal value may be removed and the remaining pieces of information may be used for calculation. In this case, since an overheat protection current value can be calculated without use of the abnormal value, the more reliable electric power steering system can be realized.

Embodiment 4

Next, an electric power steering system in accordance with an embodiment 4 of the present invention will be described below. The electric power steering system in accordance with the embodiment 4 of the present invention uses a nonvolatile memory (for example, an EEPROM) as a device in which pieces of previous information relevant to overheat protection current values employed in the embodiments 1 to 3 are stored. Even when a cause of an abnormality in computation is that data is not temporarily stored in a RAM, values stored in the EEPROM are used to continue computation for overheat protection. Thus, the more reliable electric power steering system can be realized.

Embodiment 5

Next, an electric power steering system in accordance with an embodiment 5 of the present invention will be described below. In the embodiments 1 to 4, pieces of information are stored in one area in a memory. In the electric power steering system in accordance with the embodiment 4 of the present invention, the pieces of information are stored in plural areas in the memory. Even if a specific area in the memory becomes abnormal, as long as normal values are stored in the other areas, the values are employed. In this case, since redundancy is ensured against a failure of the memory, the more reliable electric power steering system can be realized.

Various modifications and alterations of this invention will be apparent to those skilled in the art without departing from the scope and spirit of this invention, and it should be understood that this is not limited to the illustrative embodiments set forth herein.

What is claimed is:

1. An electric power steering system that includes a motor which is driven based on a target current value computed in line with a steering wheel torque exerted by a driver, and that alleviates a driver's steering effort using an assistant torque generated by the motor, comprising:
    an overheat protection current value arithmetic unit that computes an overheat protection current value to which a current flowing into the motor is limited; and
    an overheat protection control unit that limits the current, which flows into the motor, on the basis of the computed overheat protection current value, suppresses heat dissipation caused by the current flowing into the motor, and thus protects onboard equipment, wherein
    information relevant to the computed overheat protection current value is stored, and
    whether a newly computed overheat protection current value is abnormal is decided based on comparison of the newly computed overheat protection current value with the stored information relevant to the overheat protection current value.

2. The electric power steering system according to claim 1, wherein:
    overheat protection current value domains are defined as at least three sub-ranges into which a range of values to which an overheat protection current value may become equal is divided; and
    when the overheat protection current value domain to which the newly computed overheat protection current value belongs is an overheat protection current value domain that does not adjoin an overheat protection current value domain to which the stored overheat protection current value belongs, a decision is made that the newly computed overheat protection current value is abnormal.

3. The electric power steering system according to claim 1, wherein when a result of the decision signifies that the newly computed overheat protection current value is abnormal, the stored information relevant to the overheat protection current value is used to calculate an overheat protection current value, and the calculated overheat protection current value is substituted for the newly computed overheat protection current value.

4. The electric power steering system according to claim 1, wherein:
    the overheat protection current value is computed a plurality of times at intervals of a predetermined time;
    pieces of information relevant to the overheat protection current values obtained through a plurality of previous computations including an immediately previous computation are stored;
    when a result of the decision signifies that the newly computed overheat protection current value is abnormal, information closest to information relevant to an overheat protection current value obtained in a normal situation is selected from among the stored pieces of information, which are obtained through the plurality of previous computations, in order to calculate an overheat protection current value; and the calculated overheat protection current value is substituted for the newly computed overheat protection current value.

5. The electric power steering system according to claim 1, wherein:
   the pieces of information relevant to overheat protection current values are stored in a plurality of areas in a memory; and
   the overheat protection current value arithmetic unit calculates the overheat protection current value using any of the pieces of information stored in the plurality of areas in the memory.

6. The electric power steering system according to claim 5, wherein the memory is realized with a nonvolatile memory.

* * * * *